(12) United States Patent
Kralevich et al.

(10) Patent No.: US 8,087,721 B2
(45) Date of Patent: Jan. 3, 2012

(54) REINFORCEMENT BRACKET AND RELATED METHODS FOR ON-LINE PAINTING

(75) Inventors: Mark Kralevich, Powell, OH (US); Aron K. Madsen, Marysville, OH (US); Jason Ruminski, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 165 days.

(21) Appl. No.: 12/542,295

(22) Filed: Aug. 17, 2009

(65) Prior Publication Data

US 2011/0037293 A1 Feb. 17, 2011

(51) Int. Cl.
*B62D 25/16* (2006.01)

(52) U.S. Cl. .................... 296/198; 296/191; 296/193.09

(58) Field of Classification Search ................. 296/198, 296/187.09, 187.1, 191, 193.09, 203.02
See application file for complete search history.

(56) References Cited

U.S. PATENT DOCUMENTS

| | | | |
|---|---|---|---|
| 4,438,971 A * | 3/1984 | Zaydel et al. ................. | 296/191 |
| 4,735,427 A * | 4/1988 | Fuchs ........................... | 280/847 |
| 5,108,129 A | 4/1992 | Olsen | |
| 5,358,302 A | 10/1994 | Schoen et al. | |
| 5,554,252 A | 9/1996 | Foran | |
| 5,857,732 A | 1/1999 | Ritchie | |
| 5,879,045 A * | 3/1999 | Logan ....................... | 296/136.07 |
| 6,205,642 B1 * | 3/2001 | Czirmer ..................... | 29/525.13 |
| 6,237,990 B1 * | 5/2001 | Barbier et al. ........... | 296/187.09 |
| 6,821,605 B2 * | 11/2004 | Fiorinelli et al. ............. | 428/159 |
| 6,880,883 B2 * | 4/2005 | Decker et al. ........... | 296/203.02 |
| 6,929,313 B2 | 8/2005 | Fries et al. | |
| 6,951,357 B2 * | 10/2005 | Armstrong et al. .......... | 296/57.1 |
| 7,152,916 B2 * | 12/2006 | Roussel .................... | 296/203.02 |
| 7,204,545 B2 * | 4/2007 | Roux et al. ............... | 296/187.09 |
| 7,207,617 B2 * | 4/2007 | Pelini .............................. | 296/29 |
| 7,341,298 B2 * | 3/2008 | Jones .............................. | 296/29 |
| 7,540,550 B1 * | 6/2009 | Huber et al. .................... | 296/29 |
| 7,651,158 B2 * | 1/2010 | Koizumi et al. .......... | 296/203.02 |
| 7,810,828 B2 * | 10/2010 | Sugiyama et al. ........ | 280/152.05 |
| 7,828,374 B2 * | 11/2010 | Rinderlin et al. ............. | 296/198 |
| 7,909,392 B2 * | 3/2011 | Takeuchi et al. .............. | 296/198 |
| 2005/0218699 A1 * | 10/2005 | Andre et al. ............. | 296/193.09 |
| 2007/0074808 A1 | 4/2007 | Deachin et al. | |
| 2007/0216199 A1 | 9/2007 | Ito et al. | |
| 2008/0018137 A1 | 1/2008 | Troton | |

(Continued)

OTHER PUBLICATIONS

PCT International Search Report for PCT/US2010/044821, dated Mar. 25, 2011, from Korean Patent Office.

(Continued)

*Primary Examiner* — Jason S Morrow
(74) *Attorney, Agent, or Firm* — Gregory J. Burke, Esq.; Emerson Thomson Bennett

(57) ABSTRACT

A vehicle body assembly for on-line painting includes a polymeric fender and a polymeric bracket adhesively bonded to the fender. The bracket includes finger-like extensions received by an edge flange of the fender. The bracket includes a tab extension extending from an opening of the bracket engaging a support structure frame member for limited thermal expansion deformation of the fender. The adhesive a resin component and a curative component providing an initial partial cure for handling of the bracket and fender and a subsequent more fully-cured condition following high temperature baking in the on-line painting process. The assembly can also include fasteners securing the bracket to the fender to limit peeling separation of an adhesive connection provided by the adhesive.

17 Claims, 4 Drawing Sheets

U.S. PATENT DOCUMENTS

| | | |
|---|---|---|
| 2008/0111394 A1 | 5/2008 | Lewis |
| 2008/0231082 A1* | 9/2008 | Mathew ........................ 296/198 |
| 2010/0090500 A1* | 4/2010 | Montineri et al. ............ 296/191 |
| 2010/0090503 A1* | 4/2010 | Uchino ........................ 296/198 |
| 2010/0187861 A1* | 7/2010 | Schmitz ........................ 296/191 |

OTHER PUBLICATIONS

PCT Written Opinion for PCT/US2010/044821, dated Mar. 25, 2011, from Korean Patent Office.

* cited by examiner

REINFORCEMENT BRACKET AND RELATED METHODS FOR ON-LINE PAINTING

I. BACKGROUND

A. Field of Invention

The present invention generally relates to devices and methods for painting vehicle components while mitigating, lessening and/or preventing deformations due to thermal loading.

B. Description of the Related Art

It is known in the art to paint outer body components for vehicles. Further, e-coating processes are known in the art wherein coatings are applied to a part using electric current. According to some e-coating processes, the part is then subjected to a high-temperature baking step, which cures the coating. The high temperatures to which the part is subjected can cause significant thermal expansion in some materials. Furthermore, if the process is on-line, meaning the part is attached to the vehicle frame at the time of e-coating, then some materials may soften to the point of distortion or deform due to differences in thermal expansion properties of the various components.

There is a need in the art for devices and methods providing on-line painting of outer body components, particularly those made from polymers and other plastic materials, with limited deformations caused by material softening or differential thermal expansion.

II. SUMMARY

Some embodiments relate to a vehicle body assembly, comprising: a fender comprising a polymeric material; a reinforcing bracket secured to the fender, the bracket comprising a polymeric material, each of the bracket and the fender defining an outer perimeter having a forward edge and an upper lateral edge defining a forward portion of the bracket, the forward portion of the bracket defining an opening and including at least one tab extension protruding from an edge of the opening, the tab extension adapted to engage a frame member of a support structure such that deformation of the bracket due to differential thermal expansion between the vehicle body assembly and the supporting frame is limited, the bracket including a plurality of finger-like extensions protruding from the upper lateral edge of the bracket, the finger-like extensions adapted for receipt by an edge flange of the fender, the bracket defining a bonding area extending along at least a portion of the forward edge of the bracket; and an adhesive composition disposed between the fender and the bracket in the bonding area of the bracket.

Other embodiments relate to a vehicle body assembly adapted for an on-line painting process including a high-temperature baking process, the assembly comprising: a fender comprising a polymeric material; a bracket comprising a polymeric material; an adhesive composition disposed between the fender and the bracket, the adhesive composition comprising a two-component epoxy adhesive including a resin component and a curative component providing for an initial partial curing of the adhesive to facilitate handing of the fender and bracket and a subsequent more fully cured condition following high temperature baking of the assembly in an on-line painting process; and a support structure including at least one frame member, the bracket including a plurality of finger-like extensions received by an edge flange of the fender, the bracket defining an opening and a tab extension extending from an edge of the opening and engaging the frame member of the support structure so as to provide a coupled relation between the bracket and the frame member so as limit deformation of the fender from differential thermal expansion between the fender and the support structure during the high temperature baking in the on-line painting process.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE DRAWINGS

The present invention generally relates to devices and methods for online painting. In some embodiments a device for online painting can comprise an assembly that resists deformation due to high temperatures associated with a baking step of a painting process, such as an e-coating process. According to some embodiments, such an assembly can comprise a bracket adapted to mount to a frame, and an outer body member mated to the bracket in an adhesively bonded relation.

According to one embodiment, a bracket can comprise an outer perimeter having one or more tab extensions protruding from the perimeter. The one or more tab extensions can mate with a supporting frame member in a mechanically coupled relation, such as a tongue and groove and/or spring loaded relation. Furthermore, the bracket can define an inner perimeter comprising an opening in an interior region of the bracket. The inner perimeter can include one or more tab extensions protruding therefrom. The one or more tab extensions can be adapted to mate with the supporting frame in a mechanically coupled relation similar to that of the one or more outer perimeter tab extensions. According to some embodiments the bracket can further include one or more surfaces adapted to receive an adhesive component, and to adhesively bond to an outer body member. According to some embodiments, an assembly comprises the bracket mated with a supporting frame and adhesively bonded to an outer body member.

According to some embodiments the bracket and outer body member have a substantially similar coefficient of thermal expansion. Therefore, temperature changes do not produce problematic deformations that impede, complicate, or preclude a coating process. According to some embodiments the bracket and outer body member are fabricated from the same material. In other embodiments, the bracket and outer body member can be fabricated from different materials provided their coefficients of thermal expansion are sufficiently similar to prevent problematic deformations. Some suitable materials can include organic polymers, polymer blends, and/ or polymer composites. For example, suitable polymer composites can include any of a wide variety of fibers such as fiber glass, polymer fibers, ceramic fibers, and/or carbon fibers or any combination thereof.

In some embodiments supportive frame member can comprise a portion of a motor vehicle frame, an automotive frame, an aircraft frame or any other vehicle that may be subjected to high temperatures during a painting process. Furthermore, although the examples set forth herein teach embodiment related to forward portions of a vehicle, one of skill in the art will recognize that embodiments can include any other outer body component from any region of a vehicle.

Figure 1:
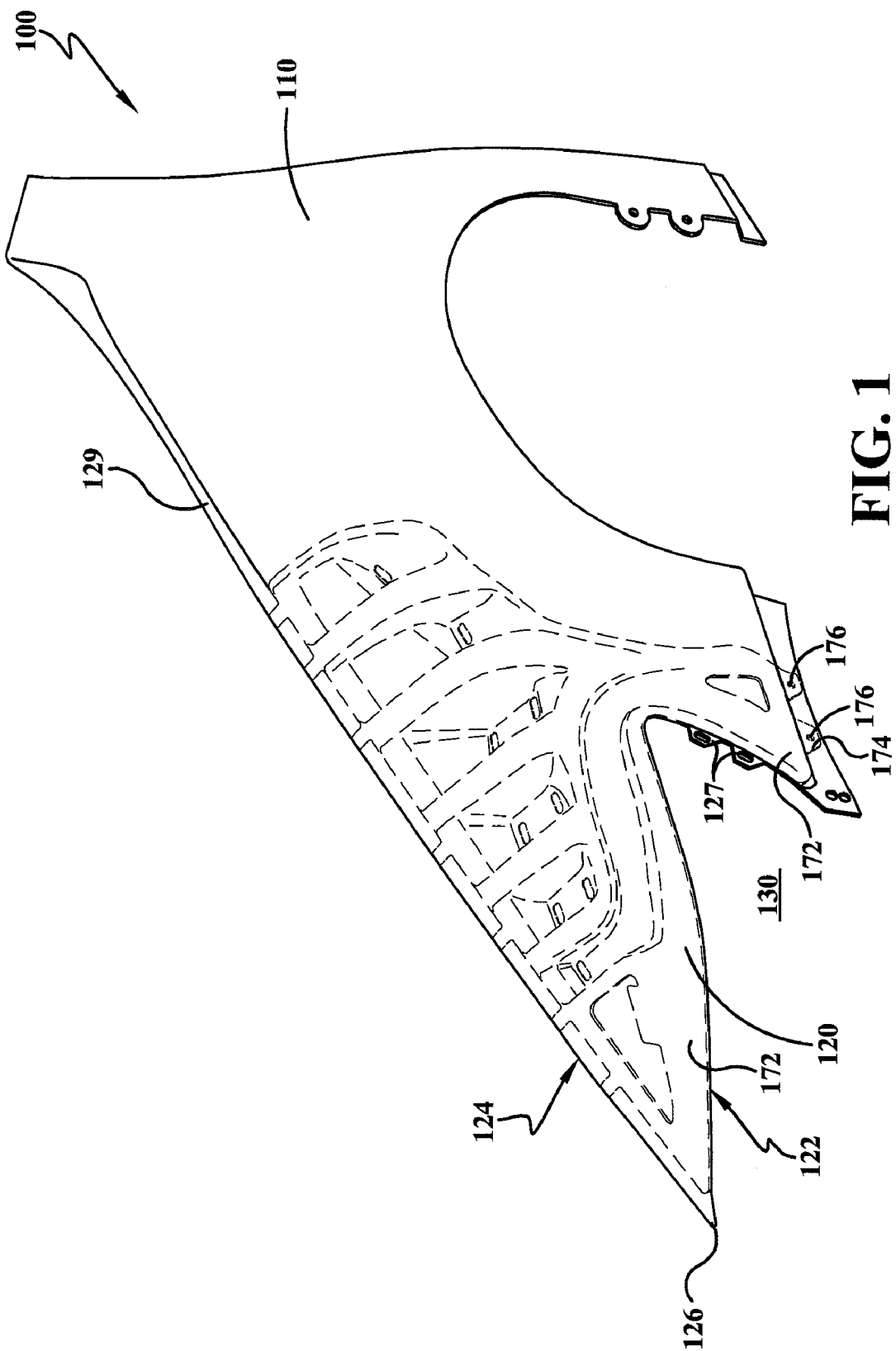
FIG. 1 is a perspective view of an assembly according to an exemplary embodiment of the present invention.

Referring now to the drawings wherein the showings are for purposes of illustrating embodiments of the invention only and not for purposes of limiting the same, FIG. 1 is a drawing of an assembly 100 including a bracket 120 and a fender 110 fitted together in an adhesively bonded relation for reinforcing a forward portion of the fender 110. According to this embodiment, the assembly 100 of the bracket 120 and fender 110 form an outer body component for a vehicle. The bracket 120 defines an upper lateral edge 124 and a forward edge 122, which meet at a cusp 126 to define a generally triangular region to reinforce a similarly shaped portion of the fender 110. The forward edge 122 of the bracket 120 defines a space 130 adapted to receive and/or partially surround a portion of a headlight. The bracket 120 includes tabs 160 providing for attachment between the outer body assembly 100 and a headlight assembly of an associated vehicle.

Figure 2:
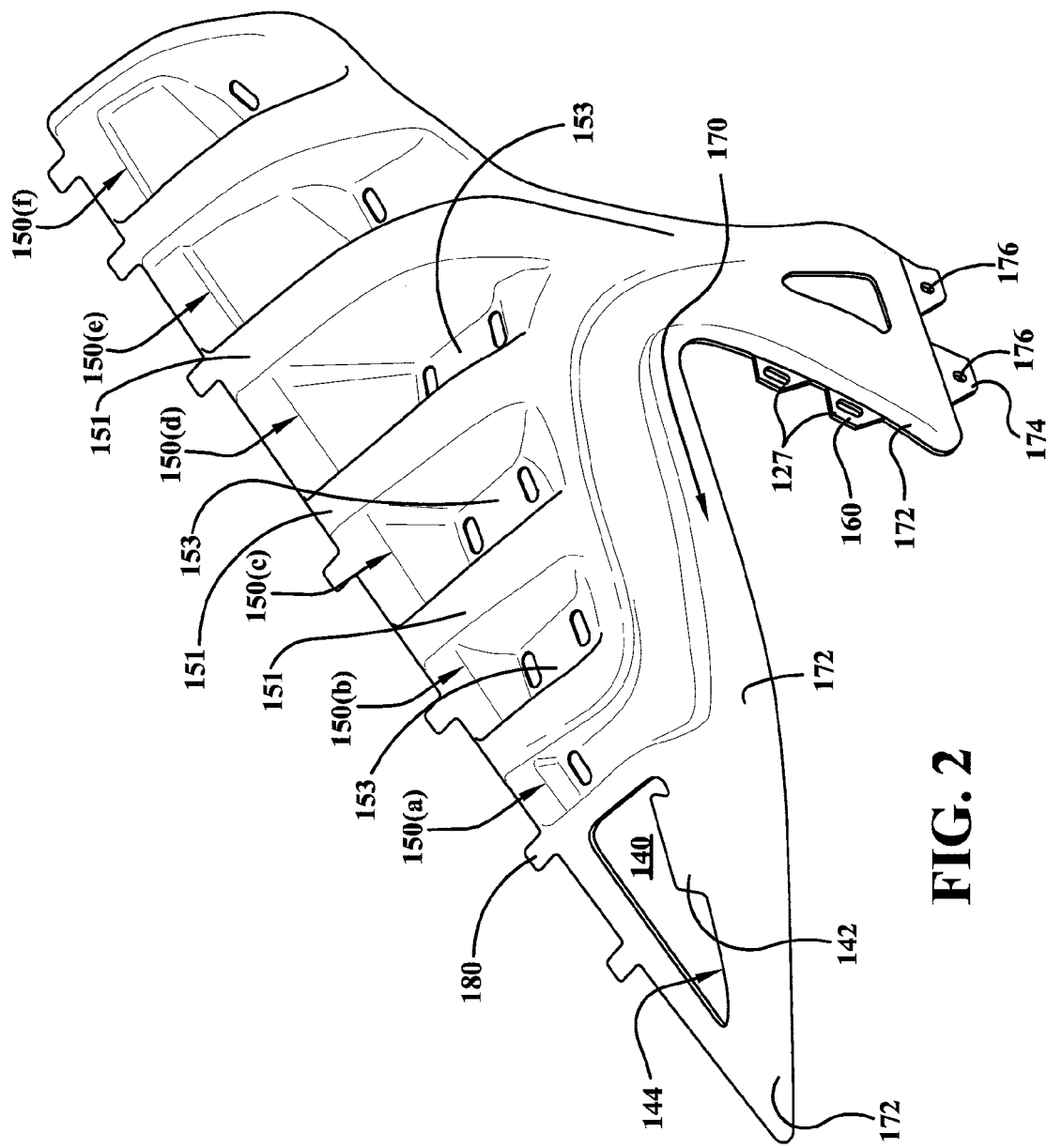
FIG. 2 is a perspective view of a bracket of the assembly of FIG. 1.

FIG. 2 shows the bracket 120 of FIG. 1 in greater detail separately from the fender 110. The upper lateral edge 124 includes a plurality of finger-like extensions 180 adapted for receipt by an edge flange 129 of the fender 110. The generally triangular region defined by the upper lateral edge 124 and the forward edge 122 further defines a generally triangular opening 140 having an inner perimeter. The inner perimeter includes a bottom edge 144 of the opening 140 from which a tab extension 142 protrudes. Tab extension 142 is adapted for engagement with a supportive frame as discussed in greater detail below. The bracket 120 includes a generally flat raised surface 170 located adjacent to an inner periphery of the bracket to define a bonding area 172 between the bracket and the fender 110. As shown, the bonding area extends about the headlight space 130. The surface 170 is adapted to receive an adhesive so that the bracket 122 mates with the outer body member 110 in an adhesively-bonded relation.

As shown in FIG. 2, the bracket 120 may include one or more formations adapted to absorb kinetic energy from an impact (e.g., from contact between the fender 110 and a pedestrian). For instance, a plurality of impact-absorbing formations 150(a), 150(b), 150(c), 150(d), and 150(e) can be included. The formations 150 include outer panel portions 151 and cone-shaped portions 153 separating the panel portions 151 and extending inwardly to stiffen the panel portions following contact between the fender 110 and the panel portions 151. Inward deflection of the outer body fender 110 (e.g., in response to a force applied to the fender) of the assembly 100 will be initially resisted by contact between the fender and one or more panel portions 151 of the impact-absorbing formations 150. The cone-shaped portions 153 function to reinforce the panel portions 151 and absorb energy (e.g., during impact between the assembly 100 and a pedestrian). As should be understood, the inclusion of the energy-absorbing formations 150 may decrease the potential for injury of a pedestrian by limiting contact between the fender and a relatively rigid frame member underlying the assembly 100. One of skill in the art will recognize that other means for absorbing kinetic energy can also be appropriate.

As discussed above, the assembly includes a bonding area 172 between the bracket 120 and fender 110 adjacent the headlight space 130 receiving an adhesive composition for securing the bracket to the fender. Appropriate adhesive components are adapted for bonding materials such as polymer materials from which the bracket and fender are made. Furthermore, appropriate adhesive components are adapted to withstand the high temperatures to which the assembly 100 is to be subjected. For instance, some e-coating processes require a high temperature baking step. Appropriate adhesives will maintain their adhesive character and will continue to bond the bracket to the outer body member in an adhesive relation.

According to one preferred embodiment, the adhesive is a two-component epoxy composition including a resin component and a curative component that reacts with the resin component to cause setting of the composition and the desired adhesive properties. Such two-component adhesive compositions are known and, therefore, no further description is required. Preferably, the composition is formulated to start curing immediately following mixture of the resin and curative compounds at a relatively slow rate and to experience an accelerated curing rate when the composition is heated. In this manner, the adhesive composition can be placed between the bracket 120 and the fender 110 to provide for an initial partial cure of the composition sufficient to provide for handling of the assembly 100 as part of an on-line process. Subsequent heating of the adhesive composition (e.g., during the baking process of an on-line painting process) will accelerate the curing process for a more complete cure of the adhesive.

The reinforcing bracket 120 of the assembly 100 includes tabs 174 at a lower edge of the bracket adjacent the bonding area 172. The tabs 174 define openings 176 for receipt of fasteners for further securing the bracket 120 to the fender 110. Such additional attachment may be desirable to prevent separation between the fender and bracket under certain loading conditions. As should be understood, the adhesive composition joining the fender and bracket is strong under shearing forces but may be subject to failure (i.e., peeling separation) under direct tensile loading. The addition of the fasteners adjacent the lower edge of the bracket 120, therefore, will desirably serve to limit such peeling separations from starting. The inclusion of the fasteners along the lower edge in combination with the fingers 180 along the upper edge serves an additional locating function to facilitate proper relative positioning when the bracket 120 and fender 110 are assembled together.

Figure 3:
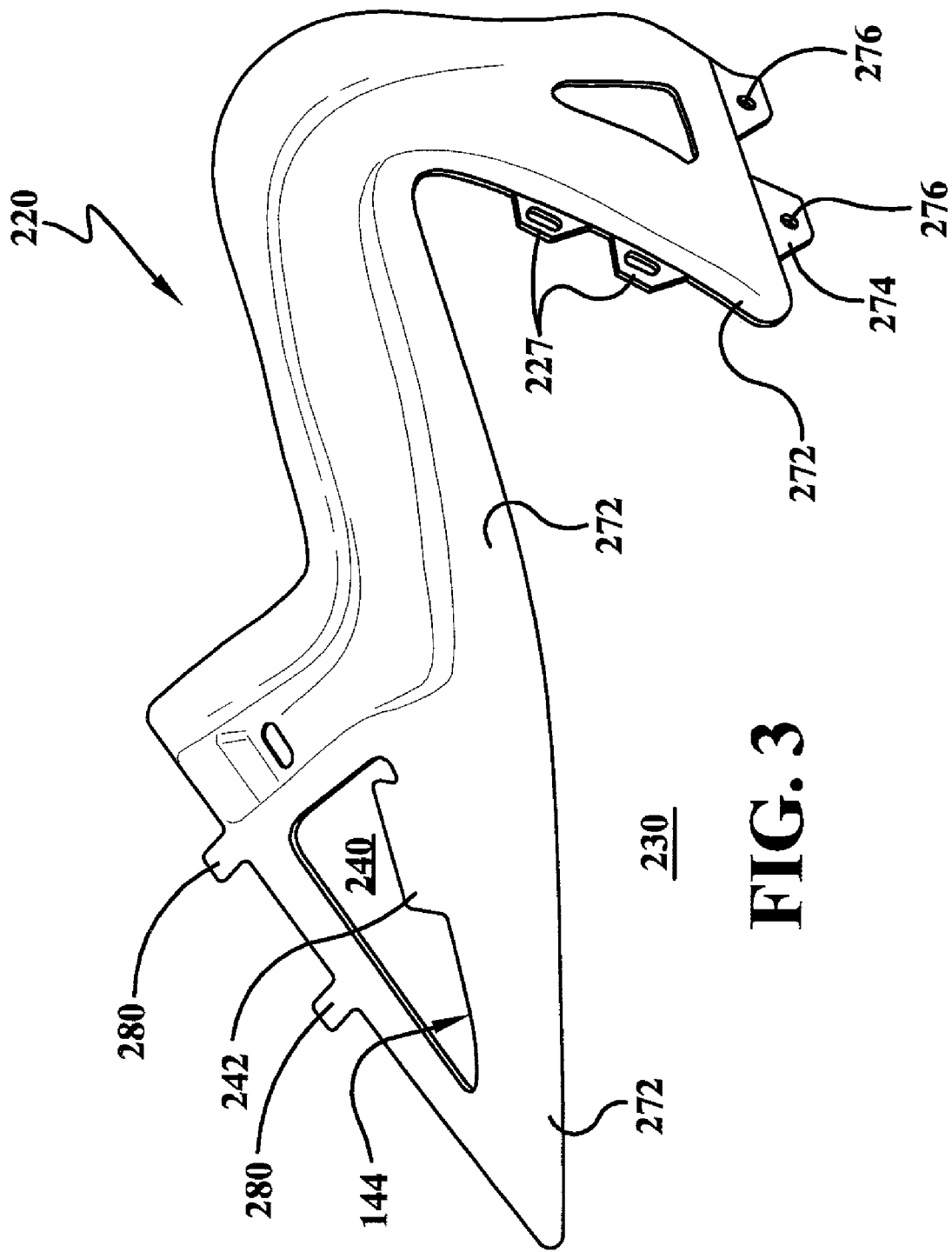
FIG. 3 is a perspective view of a bracket according to another exemplary embodiment of the invention.
Figure 4:
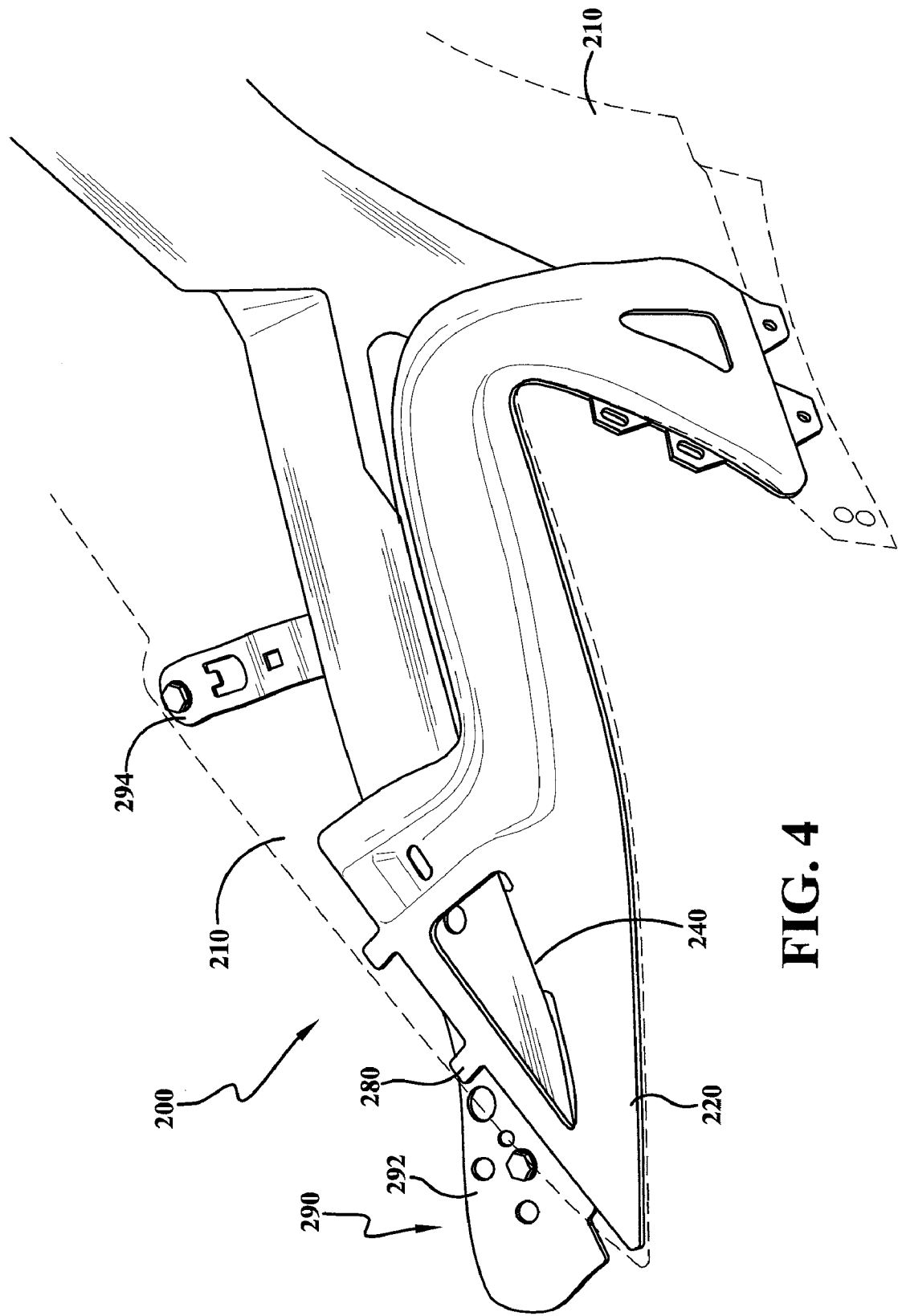
FIG. 4 is a perspective view of an assembly according to an exemplary embodiment of the invention attached to a frame.

Referring to FIGS. 3 and 4, a bracket 220 according to another exemplary embodiment of the invention is shown. Similar to the bracket 120 of FIGS. 1 and 2, the bracket 220 defines a headlight space 230 and a bonding area 272 extending adjacent the headlight space for receipt of an adhesive composition to secure the bracket to a fender (see FIG. 4). Also, similar to bracket 120, the bracket 220 includes fingers 280 along an upper edge for engagement with a flange on the fender and tabs 274 along a lower edge defining openings for receipt of fasteners. The bracket also defines an opening 240 and a tab extension 242 extending into the opening 240. The bracket 220 differs from the bracket 120 by eliminating impact-absorbing formations such as formations 150 shown in FIGS. 1 and 2.

Referring to FIG. 4, an assembly 200 including fender 210 and bracket 220 is shown in an installed condition mounted on a support frame 290. Support frame 290 could for example embody a support frame for a vehicle body in an on-line assembly or painting process. As shown, the assembly 200 is mounted to the frame 290 such that the tab extension 242 engages an edge of a frame member 292. The support frame 290 includes a support arm 294 secured (e.g., fastened) to the fender 210 of assembly along an upper edge of the fender.

As should be understood, the reinforcement of the front portion of the fender 110, 210 provided by the bracket 120, 220 of assembly 100, 200 is particularly beneficial for a support structure such as that illustrated in FIG. 4. For such a configuration, in which a plastic member is supported on a metal frame, differential thermal expansion can create significant problems. Fenders such as fender 110, 210 are typically secured to the vehicle at a rearward portion of the fender. Differential thermal expansion between the polymeric fender and the metal support structure will tend to accumulate along the length of the fender such that differential expansion will be worst at the forward end of the fender adjacent the headlight space 130, 230.

The embodiments have been described, hereinabove. It will be apparent to those skilled in the art that the above methods and apparatuses may incorporate changes and modifications without departing from the general scope of this invention. It is intended to include all such modifications and alterations insofar as they come within the scope of the appended claims or the equivalents thereof.

We claim:

1. A vehicle body assembly, comprising:
a fender comprising a polymeric material;
a reinforcing bracket secured to the fender, the bracket comprising a polymeric material,
each of the bracket and the fender defining an outer perimeter having a forward edge and an upper lateral edge defining a forward portion of the bracket,
the forward portion of the bracket defining an opening and including at least one tab extension protruding from an edge of the opening, the tab extension adapted to engage a support frame such that deformation of the bracket due to differential thermal expansion between the vehicle body assembly and the support frame is limited,
the bracket including a plurality of extensions protruding from the upper lateral edge of the bracket, the extensions adapted for receipt by an edge flange of the fender,
the bracket defining a bonding area extending along at least a portion of the forward edge of the bracket; and
an adhesive composition disposed between the fender and the bracket in the bonding area of the bracket.

2. The vehicle body assembly of claim 1, wherein the forward portion of the bracket defined by the forward edge and the upper lateral edge is triangular in shape.

3. The vehicle body assembly of claim 1, wherein the adhesive composition comprises a two-component epoxy adhesive including a resin component and a curative component.

4. The vehicle body assembly of claim 1 further comprising at least one fastener securing the bracket to the fender, the fastener located adjacent a lower edge of the bracket opposite the extensions.

5. The vehicle body assembly of claim 1, wherein the bracket includes a plurality of impact-absorbing formations arranged for contact by the fender in response to loading applied to the fender to limit deflection of the fender.

6. The vehicle body assembly of claim 5, wherein the impact-absorbing formations of the bracket include panel portions separated from each other by inwardly-extending portions that extend inwardly from the panel portions to reinforce the panel portions and absorb impact forces.

7. The vehicle body assembly of claim 1, wherein at least a portion of the forward edge of the bracket is adapted to surround at least a portion of a vehicle headlight.

8. The vehicle body assembly of claim 1, wherein the support frame is a body support frame of vehicle and the tab extension engages the support frame in a coupled relation.

9. The vehicle body assembly of claim 1, wherein the bracket defines a raised mating surface extending along at least a portion of the bonding area to facilitate an adhesive connection between the bracket and the fender in the bonding area.

10. The vehicle body assembly of claim 1, wherein either one or both of the bracket and the fender comprises a material selected from a fiberglass composite, a carbon fiber composite, or a combination thereof.

11. A vehicle body assembly adapted for an on-line painting process including a high-temperature baking process, the assembly comprising:
a fender comprising a polymeric material;
a bracket comprising a polymeric material;
an adhesive composition disposed between the fender and the bracket, the adhesive composition comprising a two-component epoxy adhesive including a resin component and a curative component providing for an initial partial curing of the adhesive to facilitate handing of the fender and bracket and a subsequent more fully cured condition following high temperature baking of the assembly in an on-line painting process; and
a support structure including at least one frame member,
the bracket including a plurality of extensions received by an edge flange of the fender,
the bracket defining an opening and a tab extension extending from an edge of the opening and engaging the frame member of the support structure so as to provide a coupled relation between the bracket and the frame member so as limit deformation of the fender from differential thermal expansion between the fender and the support structure during the high temperature baking in the on-line painting process.

12. The vehicle body assembly of claim 11, wherein the tab extension of the bracket engages an edge of the frame member.

13. The vehicle body assembly of claim 11, wherein the bracket includes a plurality of impact-absorbing formations each including an outer panel portion and an inwardly-extending portion, the inwardly-extending portions separating the outer panel portions, the outer panel portions arranged for contact with the fender in response to impact forces applied to the fender, the inwardly-extending portions reinforcing the outer panel portions and absorbing impact energy.

14. The vehicle body assembly of claim 11, wherein the support structure is a vehicle body frame supporting the fender and bracket at a forward location of a vehicle, and wherein a forward edge of the bracket at least partially surrounds a headlight of the vehicle.

15. The vehicle body assembly of claim 11, wherein the bracket defines a raised mating surface extending along at least a portion of a forward edge of the bracket, the adhesive composition contacting the mating surface of the bracket.

16. The vehicle body assembly of claim 11, wherein either one or both of the bracket and the fender comprise a material selected from a fiberglass composite, a carbon fiber composite, or a combination thereof.

17. The vehicle body assembly of claim 11 further comprising at least one fastener securing the bracket to the fender adjacent an edge of the bracket opposite the extensions to limit peeling separation of an adhesive connection provided by the adhesive composition.

* * * * *